United States Patent
Castelli (10) Patent No.: US 10,164,521 B2
(45) Date of Patent: Dec. 25, 2018

(54) CONTROL DEVICE FOR A SWITCHING REGULATOR WITH INTERLEAVED CONVERTER STAGES, SWITCHING REGULATOR AND CORRESPONDING CONTROL METHOD

(71) Applicant: STMicroelectronics S.R.L., Agrate Brianza (IT)

(72) Inventor: Claudia Castelli, Brugherio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 146 days.

(21) Appl. No.: 14/957,269

(22) Filed: Dec. 2, 2015

(65) Prior Publication Data

US 2016/0276924 A1    Sep. 22, 2016

(30) Foreign Application Priority Data

Mar. 17, 2015    (IT) ........................ 102015000008876

(51) Int. Cl.
*H02M 1/42*    (2007.01)
*H02M 3/335*    (2006.01)
(Continued)

(52) U.S. Cl.
CPC ........... *H02M 1/42* (2013.01); *H02M 1/4225* (2013.01); *H02M 3/33515* (2013.01);
(Continued)

(58) Field of Classification Search
CPC ........ H02M 3/155–3/1588; H02M 2001/0009; H02M 2003/1586
See application file for complete search history.

(56) References Cited

U.S. PATENT DOCUMENTS

| 5,614,810 A | * | 3/1997 | Nostwick | H02M 1/4225 |
| | | | | 323/207 |
| 8,098,505 B1 | * | 1/2012 | Choi | H02M 1/4225 |
| | | | | 323/272 |

(Continued)

FOREIGN PATENT DOCUMENTS

| CN | 1592063 A | 3/2005 |
| CN | 102104324 A | 6/2011 |

(Continued)

OTHER PUBLICATIONS

Choi, Hangseok, "A Cross-Coupled Master-Slave Interleaving Method for Boundary Conduction Mode (BCM) PFC Converters," IEEE Transactions on Power Electronics, 27(10), Oct. 2012, pp. 4202-4211.

(Continued)

*Primary Examiner* — Yusef A Ahmed
(74) *Attorney, Agent, or Firm* — Seed IP Law Group LLP (57) ABSTRACT

A control device for a switching regulator having two or more converter stages operating with interleaved operation, each converter stage including an inductive element and a switch element, generates command signals having a switching period for controlling switching of the switch elements, and determining alternation of a storage phase of energy in the respective inductive element and a transfer phase of the stored energy onto an output element. The control device generates the command signals phase-offset by an appropriate fraction of the switching period to obtain interleaved operation. In particular, a synchronism stage generates a synchronism signal and a control stage generates the command signals for the converter stages timed by the same synchronism signal.

19 Claims, 7 Drawing Sheets

(51) Int. Cl.
*H02M 1/00* (2006.01)
*H02M 3/158* (2006.01)
(52) U.S. Cl.
CPC .............. *H02M 2001/0009* (2013.01); *H02M 2003/1586* (2013.01); *Y02B 70/126* (2013.01)

(56) References Cited

U.S. PATENT DOCUMENTS

| | | | | | |
|---|---|---|---|---|---|
| 8,320,144 | B2* | 11/2012 | Lee | | G05F 1/70 323/207 |
| 9,722,488 | B2* | 8/2017 | Ishizeki | | H02M 1/14 |
| 2004/0095101 | A1* | 5/2004 | Pidutti | | H02M 1/4225 323/222 |
| 2005/0036337 | A1* | 2/2005 | Zhang | | H02M 3/1584 363/17 |
| 2005/0207187 | A1* | 9/2005 | Adragna | | G05F 1/70 363/21.12 |
| 2006/0103364 | A1* | 5/2006 | Adragna | | H02M 1/4225 323/282 |
| 2007/0063684 | A1* | 3/2007 | Adragna | | H02M 1/32 323/284 |
| 2007/0253224 | A1* | 11/2007 | Cohen | | H02M 1/4216 363/9 |
| 2008/0238374 | A1* | 10/2008 | Ying | | H02M 3/157 323/210 |
| 2009/0243577 | A1 | 10/2009 | Lim | | |
| 2009/0257257 | A1* | 10/2009 | Adragna | | H02M 3/1584 363/65 |
| 2010/0097041 | A1* | 4/2010 | Ayukawa | | H02M 1/4225 323/272 |
| 2010/0097828 | A1* | 4/2010 | Chen | | H02M 3/1584 363/72 |
| 2010/0181970 | A1* | 7/2010 | Yang | | H02M 3/1584 323/218 |
| 2010/0226149 | A1* | 9/2010 | Masumoto | | H02M 1/4225 363/20 |
| 2010/0244789 | A1* | 9/2010 | Osaka | | H02M 3/1584 323/271 |
| 2011/0110134 | A1* | 5/2011 | Gaboury | | H02M 1/4225 363/126 |
| 2011/0188273 | A1* | 8/2011 | Pansier | | H02M 1/4225 363/44 |
| 2011/0291631 | A1* | 12/2011 | Takahashi | | H02M 1/4225 323/283 |
| 2012/0008351 | A1* | 1/2012 | Yonezawa | | H02M 1/4225 363/89 |
| 2012/0056604 | A1* | 3/2012 | Song | | H02M 1/4225 323/207 |
| 2012/0262958 | A1* | 10/2012 | Feldtkeller | | H02M 1/4225 363/44 |
| 2013/0015786 | A1* | 1/2013 | Sakae | | H02M 1/4225 318/3 |
| 2013/0051095 | A1* | 2/2013 | Iwata | | H02M 1/4225 363/81 |
| 2013/0063180 | A1* | 3/2013 | Sun | | H02M 1/4225 326/104 |
| 2013/0194845 | A1* | 8/2013 | Bianco | | H02M 1/4225 363/90 |
| 2013/0194848 | A1* | 8/2013 | Bernardinis | | H02M 3/1584 363/126 |
| 2014/0016367 | A1* | 1/2014 | Chandrasekaran | ... | H02M 3/155 363/21.12 |
| 2014/0042992 | A1* | 2/2014 | Takata | | H02M 1/4225 323/211 |
| 2014/0049231 | A1* | 2/2014 | Takata | | H02M 1/4225 323/207 |
| 2014/0077770 | A1* | 3/2014 | Omoto | | H02M 1/4225 320/140 |
| 2014/0119070 | A1* | 5/2014 | Jeong | | H02M 1/4225 363/45 |
| 2014/0152271 | A1* | 6/2014 | Jeong | | H02M 1/4225 323/207 |
| 2014/0169049 | A1* | 6/2014 | Chandrasekaran | . | H02M 1/4225 363/84 |
| 2014/0176089 | A1* | 6/2014 | Yang | | H02M 1/4225 323/207 |
| 2014/0177295 | A1* | 6/2014 | Jang | | H02M 3/1584 363/44 |
| 2014/0223949 | A1* | 8/2014 | Sakae | | H02M 3/1584 62/324.1 |
| 2015/0138857 | A1* | 5/2015 | Ye | | H02M 1/4225 363/89 |
| 2015/0155776 | A1* | 6/2015 | Castelli | | H02M 1/4208 323/205 |
| 2016/0172975 | A1* | 6/2016 | Takeya | | H02M 1/08 363/126 |
| 2016/0218624 | A1* | 7/2016 | Ishizeki | | H02M 1/32 |
| 2016/0248318 | A1* | 8/2016 | Ishizeki | | H02M 1/14 |
| 2016/0322898 | A1* | 11/2016 | Bianco | | H02M 1/4225 |
| 2017/0012540 | A1* | 1/2017 | Jeong | | H02M 1/32 |
| 2017/0187279 | A1* | 6/2017 | Oe | | H02M 1/42 |

FOREIGN PATENT DOCUMENTS

| | | |
|---|---|---|
| CN | 103683984 A | 3/2014 |
| EP | 1 387 477 A1 | 2/2004 |

OTHER PUBLICATIONS

Huber et al., "Implementation of Open-Loop Control for Interleaved DCM/CCM Boundary Boost PFC Converters," Applied Power Electronics Conference and Exposition, APEC 2008, Twenty-Third Annual IEEE, Feb. 24-28, 2008, pp. 1010-1016.

Huber et al., "Open-Loop Control Methods for Interleaved DCM/CCM Boundary Boost PFC Converters," IEEE Transactions on Power Electronics, 23(4), Jul. 2008, pp. 1649-1657.

Huber et al., "Closed-Loop Control Methods for Interleaved DCM/CCM Boundary Boost PFC Converters," Applied Power Electronics Conference and Exposition, APEC 2009, Twenty-Fourth Annual IEEE, Feb. 15-19, 2009, pp. 991-997.

Lu, Bing, "A Novel Control Method for Interleaved Transition Mode PFC," Applied Power Electronics Conference and Exposition, APEC 2008, Twenty-Third Annual IEEE, Feb. 24-28, 2008, pp. 697-701.

Xu et al., "A Novel Closed Loop Interleaving Strategy of Multiphase Critical Mode Boost PFC Converters," Applied Power Electronics Conference and Exposition, APEC 2008, Twenty-Third Annual IEEE, Feb. 24-28, 2008, pp. 1033-1038.

* cited by examiner

CONTROL DEVICE FOR A SWITCHING REGULATOR WITH INTERLEAVED CONVERTER STAGES, SWITCHING REGULATOR AND CORRESPONDING CONTROL METHOD

BACKGROUND

Technical Field

The present disclosure relates to a control device for a power converter, in particular a power-factor-correction (PFC) regulator, with interleaved stages, i.e., including two or more converter stages operating with a suitable mutual phase offset; the present disclosure further regards a corresponding switching regulator and a corresponding control method.

Description of the Related Art

Switched-mode power supplies are known, designed to convert a quantity received at an input, for example an AC voltage coming from the electrical mains supply, into a regulated output quantity, for example a DC voltage, for supply of an electrical load.

Such power supplies have generally to meet stringent requirements as regards the corresponding electrical performance; for example, they have to guarantee a high quality factor and a substantially unitary power factor.

For this reason, it is generally envisaged the use, in an input stage of the power supply, of a switching regulator, the so-called "PFC regulator", controlled by a suitable control device for regulating the power factor in drawing from the power grid.

In particular, in applications that entail drawing of a considerable power, for example of about 1 kW, for instance for flat screen television (flat TVs) or for industrial applications, the use has been proposed of a PFC regulator having a number of interleaved converter stages, operating with a suitable phase offset. It may be shown in fact that use of a number of interleaved converter stages enables an increase of the power level that may be reached as compared to the use of a single converter stage.

Figure 1:
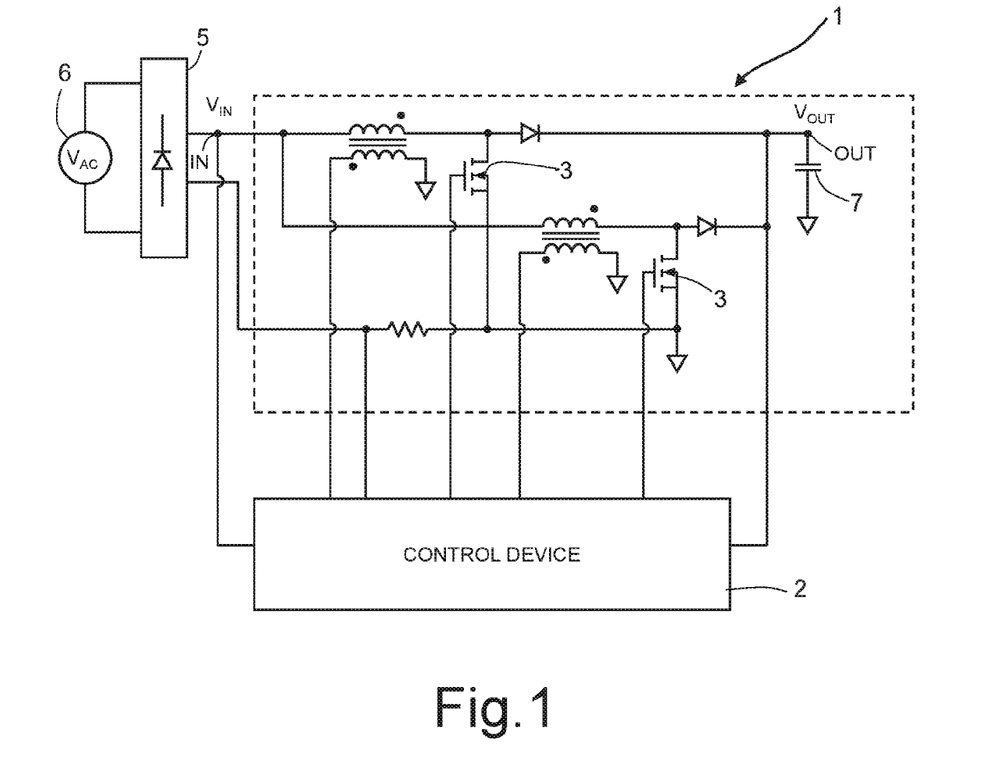
FIG. 1 shows a schematic block diagram of a PFC regulator and of a corresponding control device, of a known type.

A PFC regulator 1 is depicted by way of example in FIG. 1; PFC regulator 1 is controlled by a corresponding control device 2 and comprises two converter stages 3 (not described in detail herein), interleaved and operating in this case in phase opposition, i.e., with a phase offset of 180°.

The PFC regulator 1 has: an input terminal IN, present on which is an input voltage $V_{IN}$, generated by a rectifier stage 5 starting from an AC line voltage $V_{AC}$, for example supplied by a supply line 6 from the electrical grid; and an output terminal OUT, to which a charge-storage element 7 is connected, in particular a capacitor, present on which is an output voltage $V_{OUT}$, for example a DC voltage, which is regulated at a desired value.

In a way not described in detail herein and illustrated in FIG. 1, each converter stage 3 comprises at least one inductive element and a switch element, which is operatively coupled to the inductive element and is controlled in pulse-width-modulation (PWM) switching by the control device 2, for cyclically storing energy in the inductive element in a first interval (for example, the so-called ON interval $T_{ON}$) of the switching period, and for releasing the energy stored to the charge-storage element 7 in a second interval (in the example, the so-called OFF interval $T_{OFF}$) of the switching period.

The control device 2 is made as an integrated circuit, and has a package and corresponding input and output pins, and may be mounted on a same printed circuit board (PCB) with the circuit components forming the PFC regulator 1.

In a way not described in detail herein, the control device 2 supplies command signals to the switch elements of the converter stages 3, and receives feedback signals from the same converter stages 3, to provide regulation of the output voltage $V_{out}$ via an appropriate control loop.

Figure 2:
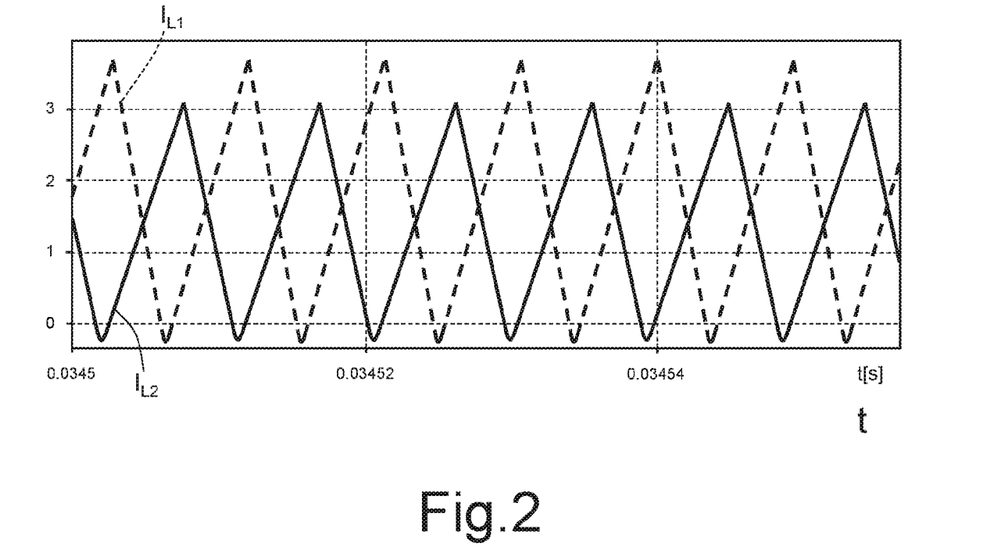
FIG. 2 shows plots of electrical quantities in the PFC regulator of FIG. 1.

The purpose of the control device 2 is to obtain in the inductive elements of the converter stages 3 currents that are phase-shifted by the desired phase offset (in the example, by 180°). In this regard, FIG. 2 shows the desired plot of the currents in the inductive elements of the converter stages 3, designated by $I_{L1}$ and $I_{L2}$, which are phase-offset by 180°.

Achieving this purpose is not, however, altogether straightforward, given that the system works at a continuously variable switching frequency, as the working condition varies, for example as a result of: the variation of the line voltage $V_{AC}$ between successive line periods, or cycles; the presence of noise on the supply line 6; the variation of the power on the load; the presence of start-up and shut-down transients; or the presence of so-called "phase shedding" events (in order to optimize the overall efficiency of the system, individual stages may be started up or shut down to modify the number of active stages for adapting to the requirements of the load). Furthermore, the switching frequency may be variable also on account of possible tolerances and drifts in the electrical components.

There are several solutions that have so far been proposed to achieve the control objective referred to previously.

For instance, an open-loop-control approach of the master-slave type has been proposed. In this regard, there may be cited, for example:

L. Huber, B. T. Irving, and M. M. Jovanovic, "Open-loop control methods for Interleaved DCM/CCM Boundary Boost PFC converters", IEEE Trans., Power Electron., July, 2008; and L. Huber, B. T. Irving, C. Adragna, and M. M. Jovanovic, "Implementation of Open-loop-control for Interleaved DCM/CCM Boundary Boost PFC converters", IEEE Applied Power Electronics Conf. APEC, February 2008.

In this solution, one converter stage operates in so-called transition mode (TM) while the other converter stage operates in discontinuous-conduction mode (DCM). This operating mode leads to a deterioration of the performance of the system. In DCM, there is in fact a reduction of the overall efficiency of the system and an increase of electromagnetic interference (EMI).

A further solution proposed envisages a closed-loop control based upon a phase-locked loop (PLL). In this regard, the following may, for example, be cited:

L. Huber, B. T. Irving, and M. M. Jovanovic, "Closed-loop control methods for Interleaved DCM/CCM Boundary Boost PFC converters", Proc. IEEE Appl. Power Electron. Conf., February, 2009.

The so-called natural-interleaving technique belongs to this category described, for example, in:

B. Lu, "A novel control method for Interleaved Transition Mode PFC", IEEE 2008—TI UCC28060.

In this solution, both of the converter stages operate as master, and the duration of the ON interval ($T_{ON}$) in the switching period of each stage is modulated on the basis of the relation of phase and frequency. In this way, transition-mode (TM) operation is guaranteed for both phases.

Since closed-loop methods require lowpass filtering, they are able to respond to disturbance and to transients in a relatively slow way. In some cases, a change of the working mode and a consequent loss of interleaving may cause a severe unbalancing between the currents of the individual phases.

A further solution proposed envisages a cross-coupled master-slave relationship; see for example:

H. Choi and L. Balogh, "A cross-coupled master-slave Interleaving Method for boundary conduction Mode PFC converters", IEEE Trans. Power Electron., Oct. 20, 2012—Fairchild FAN9611.

In the above solution, the natural period of each phase is measured, and in the next cycle this period is used together with the so-called zero-crossing-detection (ZCD) signal, for determining the instant of turning-on of the switch element of the converter stages. Consequently, each phase may each time be master or slave, and the interleaving timing may be modified dynamically so that the solution is robust to transients.

The present Applicant has, however, realized that also this solution is not altogether advantageous, at least in that it does not guarantee a transition operating mode for both of the phases.

BRIEF SUMMARY

The need is thus certainly felt to provide a solution for controlling a PFC regulator with interleaved converter stages that will enable the limitations of the known solutions to be overcome. An aim of the present disclosure is to solve the problems highlighted previously and to satisfy this need.

According to the present disclosure a control device for a switching regulator, a corresponding switching regulator and corresponding control method, are consequently provided.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

As will be described in detail hereinafter, one aspect of the present solution envisages that each converter stage of the PFC regulator with interleaved converter stages is controlled in transition mode with a same duration of the ON interval ($T_{ON}$) of the duty cycle, this duration being further substantially constant for each line cycle of the power line voltage.

In particular, the present solution envisages that an appropriate synchronism signal is generated, and that the PWM command signals for switching of the switch elements of the converter stages are timed on the basis of this synchronism signal for obtaining and maintaining a desired mutual phase offset (for example, in the case of two converter stages, a phase offset of 180°).

The control approach does not thus envisage the presence of master or slave converter stages, but rather an approach that may be defined as "democratic", where all the converter stages are synchronized by a common synchronism signal.

In particular, this synchronism signal is generated on the basis of the estimate of the duration of an appropriate fraction of the switching period (in the case of two converter stages, on the basis of the estimate of the switching half-period for generating the desired phase offset of 180°).

A particular aspect of the present solution envisages for this purpose, first determination of a corresponding fraction of the duration of a first interval of the duty cycle (in particular, the ON interval $T_{ON}$; for example, its semi-duration $T_{ON}/2$), and then, on the basis of this determination, the estimate of the duration of the corresponding fraction of the remaining interval of the duty cycle (the OFF interval $T_{OFF}$; in the example its semi-duration $T_{OFF}/2$) for estimating as a whole the desired fraction of the switching period, on the basis of which the synchronism signal is generated.

It is known that the switching frequency of a converter stage may be expressed as a function of the input voltage $V_{IN}$, of the output voltage $V_{OUT}$, and of the ON interval $T_{ON}$ (assumed, as mentioned previously, as being substantially constant and the same for the converter stages).

Considering by way of a non-limiting example a boost type of converter for the converter stages operating in transition mode, the following relation for estimating the switching frequency $f_{sw}$ (variable in time, for the reasons set forth previously) applies:

$$f_{sw}(t) = \frac{1}{T_{ON}} \cdot \left(1 - \frac{V_{IN}(t)}{V_{OUT}(t)}\right)$$

Exploiting the relation of energy balance of each converter stage during a switching period (i.e., the relation of charge and discharge of the corresponding inductive element), it is possible to predict the duration of the OFF interval $T_{OFF}$ starting from the determination of the duration of the ON interval $T_{ON}$ and from the detection of the values of input voltage $V_{IN}$ and output voltage $V_{OUT}$ on the basis of the following relation:

$$\int_0^{T_{ON}} V_{IN}(t) \cdot dt = \int_{T_{ON}}^{T_{sw}} (V_{OUT}(t) - V_{IN}(t)) \cdot dt$$

The charging current during the interval $T_{ON}$ (or an appropriate fraction thereof) is proportional to the input voltage $V_{IN}$, while the corresponding discharging current during the interval $T_{OFF}$ (or an appropriate fraction thereof) is proportional to the difference between the output voltage $V_{OUT}$ and the input voltage $V_{IN}$. The resulting discharge time is the estimate of the duration of the interval $T_{OFF}$ (or its appropriate fraction), starting from which the switching period may be estimated.

An aspect of the present solution thus envisages, as will also be described in detail hereinafter, that the control device of the PFC regulator includes: a stage for generating the desired fraction of the duration of a first interval of the duty cycle (for example, the semi-duration $T_{ON}/2$); and a stage for estimating the corresponding fraction of the switching period $T_{SW}$ (i.e., of the period of the synchronism signal) on the basis of the aforesaid determination and on the basis of the relation of energy balance of the converter stage.

Next, the synchronism signal for ensuring interleaved operation of the converter stages is generated as a function of the estimate made, and the PWM command signals for the switch elements of the various converter stages are synchronized based on this synchronism signal, in particular at the rising and falling edges of the common synchronism signal.

The timing of each switching cycle is thus determined on the basis of the same synchronism signal for ensuring correct interleaved operation in transition mode of all the converter stages.

Figure 3:
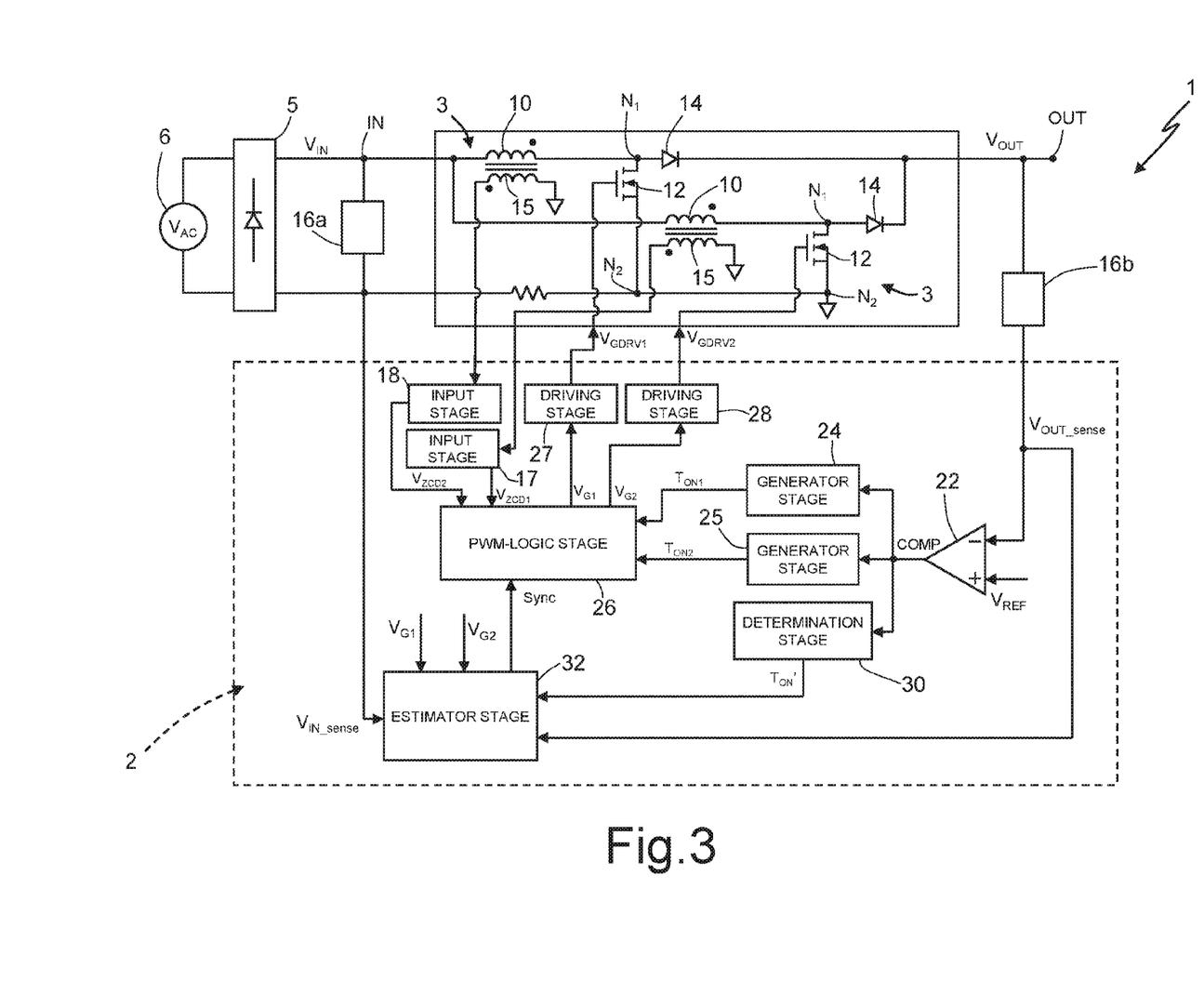
FIG. 3 is a schematic block diagram of a PFC regulator and of a corresponding control device according to one embodiment of the present disclosure.

With reference to FIG. 3, a detailed description, provided by way of non-limiting example, of an embodiment of the present solution is now presented, regarding a PFC regulator, designated once again by 1.

PFC regulator 1 comprises, in the example, two converter stages 3, that have a boost topology and operate in transition mode with substantially constant duration (along one or more power line cycles) of the ON interval $T_{ON}$.

As mentioned previously, the PFC regulator 1 has: an input terminal IN, present on which is the input voltage $V_{IN}$, generated by the rectifier stage 5 starting from the line voltage $V_{AC}$ supplied by the supply line 6 starting from the electrical power grid; and an output terminal OUT, to which charge-storage element (here not illustrated) is connected and present on which is the output voltage $V_{OUT}$.

Each converter stage 3 may comprise, in a per se known manner: an inductive element 10, connected between the input terminal IN and a first internal node $N_1$; a switch element 12, in particular a MOSFET, connected between the first internal node $N_1$ and a second internal node $N_2$; and a diode element 14, having its anode connected to the first internal node $N_1$ and its cathode connected to the output terminal OUT.

The switch element 12 has a first current-conduction terminal, in particular the drain terminal of the respective MOSFET, connected to the first internal node $N_1$, a second current-conduction terminal, in particular the source terminal of the respective MOSFET, connected to the second internal node $N_2$, and a control terminal that defines the gate terminal of the respective MOSFET. The second internal node $N_2$ is in the example connected to a reference potential, for example to ground.

Each converter stage 3 of the PFC regulator 1 further comprises an auxiliary winding 15, magnetically coupled to the inductive element 10 and present on which is a control voltage (hereinafter, designated by $V_{ZCD1}$ and $V_{ZCD2}$ are the control voltages of the two converter stages 3).

The control device 2 has: an input pin, designed to receive a sensing voltage $V_{IN\_sense}$, indicative of the input voltage $V_{IN}$, from a sensing stage 16a (for example, including a resistive divider), coupled to the input terminal IN; a further input pin designed to receive a second sensing voltage $V_{OUT\_sense}$, indicative of the output voltage $V_{OUT}$, from a respective sensing stage 16b (for example, including a respective resistive divider), coupled to the output terminal OUT; further input pins designed to be connected to the auxiliary winding 15 of a respective converter stage 3 and to receive a respective control voltage $V_{ZCD1}$, $V_{ZCD2}$, which is a function of the voltage across the auxiliary winding 15, from a respective input stage 17, 18; and output pins, designed to be connected to a respective control terminal of switch element 12 of a respective converter stage 3 for supplying a respective driving voltage $V_{GDRV1}$, $V_{GDRV2}$ for driving switching of the switch element 12 in pulse-width-modulation (PWM).

The control device 2 is configured to control operation of the converter stages 3 in transition mode (also defined as "critical-conduction mode" or "boundary-conduction mode").

In particular, at each switching cycle, the control device 2 drives closing of the switch element 12 for an ON interval ($T_{ON}$ of the duty cycle), during which the current coming from the supply flows in the inductive element 10 and in the switch element 12 towards ground, causing storage of energy in the inductive element 10.

The duration of the ON interval $T_{ON}$ is determined by the control device 2 by an appropriate feedback control loop based on the value of the output voltage $V_{OUT}$, in particular on the value of the sensing voltage $V_{OUT\_sense}$ indicating the output voltage $V_{OUT}$, which is compared with an appropriate reference voltage $V_{REF}$.

In detail, the control device 2 comprises for this purpose an amplifier stage 22, which receives at input the sensing voltage $V_{OUT\_sense}$ and the reference voltage $V_{REF}$, and generates, as a function of their difference, a compensation signal COMP for the voltage control loop, indicative of the output power of the PFC regulator 1.

The control device 2 further comprises a first generator 24 and a second generator 25, which generate a respective time signal $T_{ON1}$, $T_{ON2}$, indicating the duration of the ON interval of the switch element 12 of the respective converter stage 3, on the basis of the aforesaid compensation signal COMP.

Next, the control device 2 drives opening of the switch element 12 of each converter stage 3 for an OFF interval $T_{OFF}$ of the duty cycle, during which the energy previously stored in the inductive element 10 is transferred to the load.

In particular, upon completion of energy transfer, the current in the inductive element 10 is zero. A resonance condition around the value of the input voltage $V_{IN}$ arises on the voltage at the first internal node $N_1$, on account of the capacitance present on the same first internal node $N_1$, which is mainly due to the parasitic capacitance on the drain terminal of the MOSFET of the switch element 12 and to the parasitic capacitance of the diode element 14 (in turn-off condition).

This resonance phase terminates (giving rise to the next energy-storage phase) when the voltage on the first internal node $N_1$ reaches a lower threshold, for example zero.

If the switch element 12 is closed (and the corresponding MOSFET turned on) at this instant, i.e., at the minimum of the resonant oscillation present on the drain voltage of the corresponding MOSFET, when energy transfer is completed, the converter operates in a switching condition with zero current and voltage, enabling a high efficiency, this control being defined as "zero-current detection" (ZCD).

Detection of the zero-current condition, required for determination of the duration of the OFF interval $T_{OFF}$, is performed by control device 2 on the basis of the control voltage $V_{ZCD1}$, $V_{ZCD2}$, which in turn is a function of the voltage across the auxiliary winding 15. The control voltage $V_{ZCD1}$, $V_{ZCD2}$ is in fact indicative of the zero-current (and zero-voltage) condition in the respective inductive element 10.

In particular, the instant at which the value of the control voltage $V_{ZCD}$ goes to zero during resonance is determined, which corresponds to the instant at which the voltage at the first internal node $N_1$ is equal to the input voltage $V_{IN}$.

The control device 2 thus comprises: a PWM-logic stage 26, configured for generating PWM command voltages $V_{G1}$, $V_{G2}$ for the switch elements 12 of the converter stages 3 as a function of the control voltages $V_{ZCD1}$, $V_{ZCD2}$ of the same converter stages 3 and as a function of the time signals $T_{ON1}$, $T_{ON2}$; and driving stages 27, 28, which for example include respective buffers that receive the aforesaid PWM command voltages $V_{G1}$, $V_{G2}$ and generate the corresponding driving signals $V_{GDRV1}$, $V_{GDRV2}$ for the control terminals of the MOSFETs of the switch elements 12 of each converter stage 3.

According to a particular aspect of the present solution, as referred to previously, generation of the PWM command voltages $V_{G1}$, $V_{G2}$ by the PWM-logic stage 26 is based, not only on the control voltages $V_{ZCD1}$ and $V_{ZCD2}$, but also on a synchronism signal Sync, appropriately generated for synchronizing interleaved operation of the converter stages 3 and for this purpose received by the PWM-logic stage 26. In particular, the end of the OFF interval $T_{OFF}$ of the duty cycle, and the start of the next ON interval $T_{ON}$, for each converter stage 3, is appropriately synchronized to the rising and falling edges of synchronism signal Sync.

In detail, the control device 2 thus comprises: a determination stage 30, which receives the compensation signal COMP and an enable signal EN, and is configured to generate, when enabled by the enable signal EN, a signal $T_{ON}'$ indicative of a desired fraction of the duration of a first interval of the duty cycle, in the example the ON interval (which constitutes an active interleaving interval); and a synchronism stage 32, configured to perform the estimate of the corresponding fraction of the switching period $T_{SW}$ on the basis of the aforesaid active interleaving interval and on the basis of the relation of energy balance of the converter stage.

In particular, the synchronism (or estimator) stage 32 receives at input the sensing voltage $V_{IN\_sense}$, the sensing voltage $V_{OUT\_sense}$, the signal indicative of the active interleaving interval $T_{ON}'$, and also the PWM command signals $V_{G1}$, $V_{G2}$, and generates at output the synchronism signal Sync for the PWM-logic stage 26.

Figure 4:
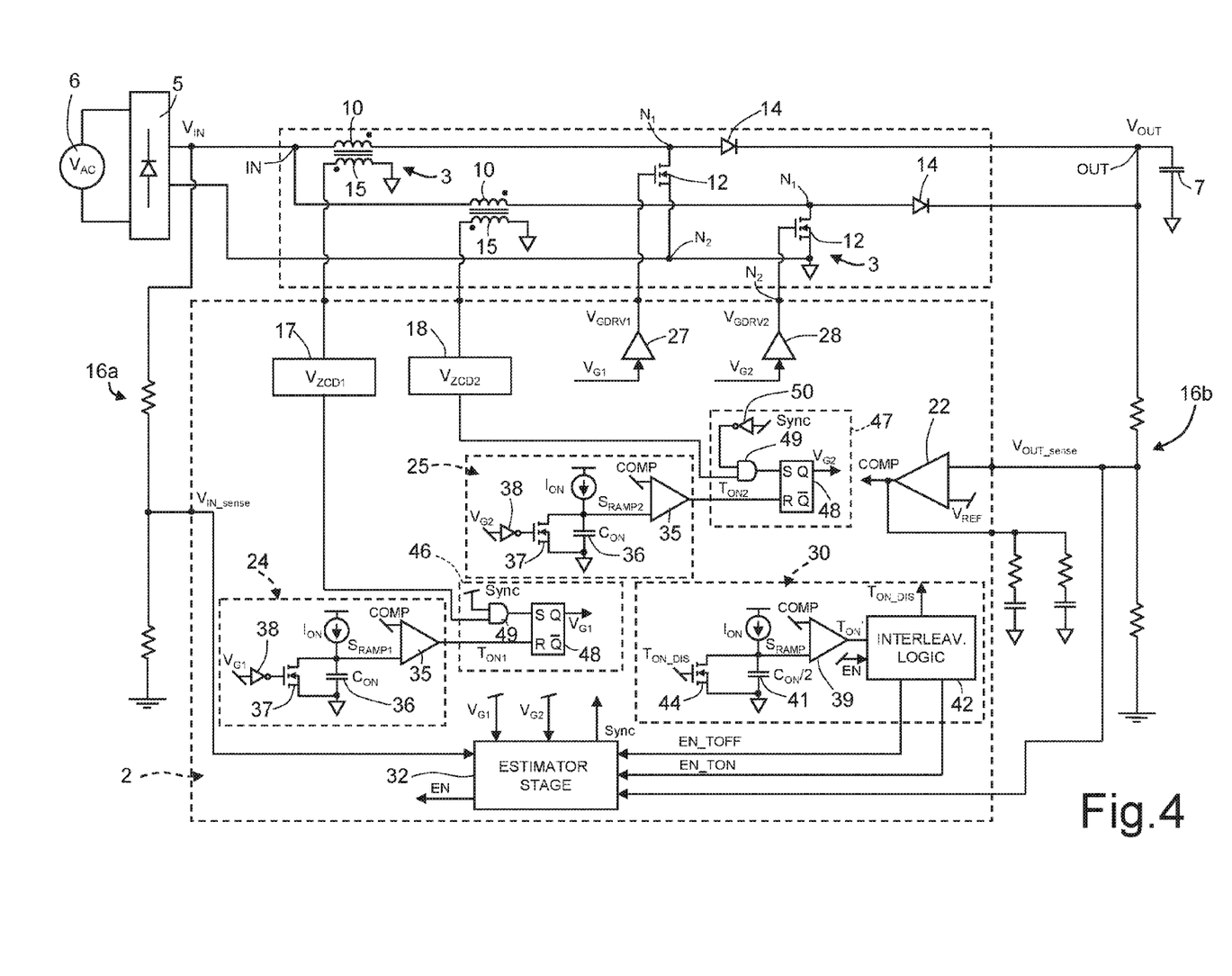
FIGS. 4 and 5 show more detailed circuit diagrams of the PFC regulator of FIG. 3.

In greater detail, and with reference to FIG. 4, the first and second generators 24, 25 each comprise a respective comparator 35, which compares the compensation signal COMP with a respective ramp signal $S_{ramp1}$, $S_{ramp2}$, for generating the respective time signal $T_{ON1}$, $T_{ON2}$ indicative of the duration of the ON interval of the switch element 12 of the respective converter stage 3 (which is substantially the same in the various converter stages 3).

The ramp signal $S_{ramp1}$, $S_{ramp2}$ is generated by charging of a capacitor 36, having a capacitance $C_{ON}$, with an appropriate constant charging current $I_{ON}$. A switch element 37, driven as a function of the respective PWM command voltage $V_{G1}$, $V_{G2}$ is further connected in parallel to the capacitor element 36 to cause the start of charging and subsequent discharging. In particular, the switch element 37 is made with a transistor having its control terminal connected to the output of an inverter 38, which receives at input the respective PWM command voltage $V_{G1}$, $V_{G2}$.

Likewise, the determination stage 30 comprises a respective comparator 39, which compares the compensation signal COMP with a respective ramp signal $S_{ramp}$, for generating the time signal $T_{ON}'$ indicative of the active interleaving interval.

The ramp signal $S_{ramp}$ is generated by charging with the charging current $I_{ON}$ of a capacitor element 41, having a capacitance $C_{ON}/2$ equal to one half of the capacitance $C_{ON}$ of the capacitor 36, so that the active interleaving interval corresponds, in the example, to one half ($T_{ON}/2$) of the ON interval $T_{ON}$ (in order to generate different fractions of the ON interval $T_{ON}$ it is thus sufficient to suitably modify the value of capacitance of the capacitor element 41).

The ramp signal $S_{ramp}$ is started by the enable signal EN.

The determination stage 30 further comprises an interleaving-logic block 42, which receives the enable signal EN and the time signal $T_{ON}'$ indicative of the active interleaving interval and supplies at output a charge-enable signal $EN\_T_{on}$ and a discharge-enable signal $EN\_T_{off}$ for the synchronism stage 32 (the function of which is described in detail hereinafter).

The interleaving-logic block 42 is further configured to generate a disable signal $T_{ON\_DIS}$ for controlling a switch element 44, connected in parallel to the capacitor element 41 (which thus controls charging and discharging thereof).

Advantageously, matching may be achieved between the circuit components (in particular, the corresponding capacitor elements 36 and 41) of the determination stage 30 and of the first and second generators 24, 25 so that the active interleaving interval corresponds effectively to one half of the ON interval $T_{ON}$ of the converter stages 3.

The PWM-logic stage 26 comprises a first generation block 46 and a second generation block 47 for generation of the PWM command voltages $V_{G1}$ and, respectively, $V_{G2}$.

Each generation block 46, 47 comprises a respective S/R flip-flop 48, which has: a reset input connected to the output of the respective comparator 35 for receiving the respective time signal $T_{ON1}$, $T_{ON2}$; a set input connected to the output of an AND logic gate 49, which receives at input the respective control voltage $V_{ZCD1}$, $V_{ZCD2}$ and further, in the case of the first generation block 46, the synchronism signal Sync, whereas, in the case of the second generation block 47, the same synchronism signal Sync, but appropriately inverted by an inverter block 50; and an output, which supplies the respective PWM command voltage $V_{G1}$, $V_{G2}$.

Each generation block 46, 47 thus generates the respective PWM command voltage $V_{G1}$, $V_{G2}$ as a function of the output of the respective comparator 35 and of the respective control voltage $V_{ZCD1}$, $V_{ZCD2}$, and further as a function of the synchronism signal Sync. In particular, the output of the comparator 35 causes opening or turning-off of the switch element 12 of the respective converter stage 3 by asserting the reset input of the respective S/R flip-flop 48, whereas the control voltage $V_{ZCD1}$, $V_{ZCD2}$, appropriately combined with the synchronism signal Sync, causes turning-on of the same switch element 12 (in transition mode TM, and ensuring the desired interleaving).

In a possible embodiment (illustrated in FIG. 5), the synchronism stage 32 comprises: a capacitor element 51; a charging-current generator 52, designed to generate an appropriate charging current for the capacitor element 51, as a function of the sensing voltage $V_{IN\_sense}$, when enabled by the charge-enable signal $EN\_T_{on}$; and a discharging-current generator 54, designed to generate an appropriate discharging current for the capacitor element 51 as a function of the difference between the sensing voltages $V_{OUT\_sense}$ and $V_{IN\_sense}$ (obtained by a subtractor block 55) when enabled by the discharge-enable signal $EN\_T_{off}$.

Figure 5:
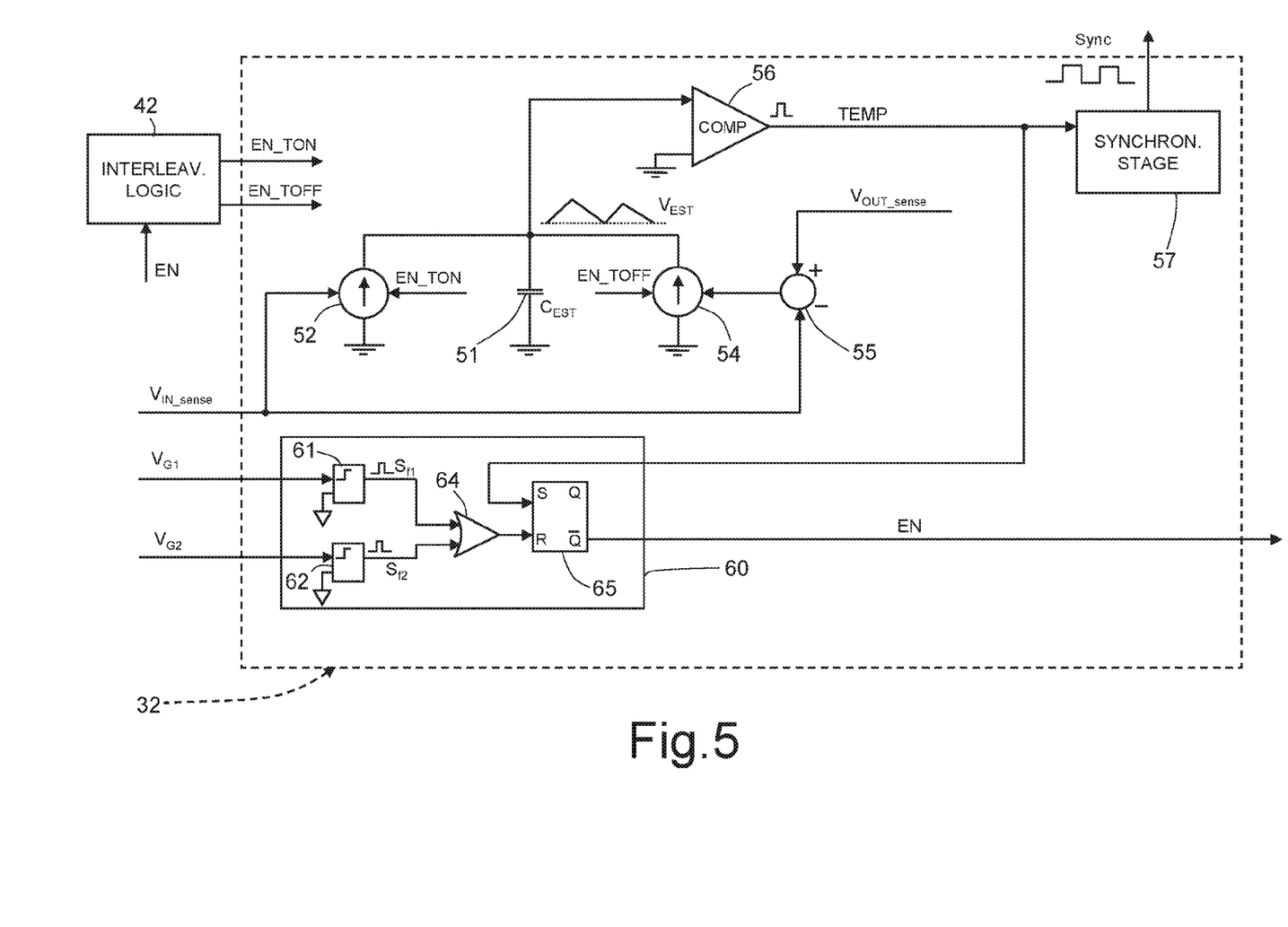
Figure 6A:
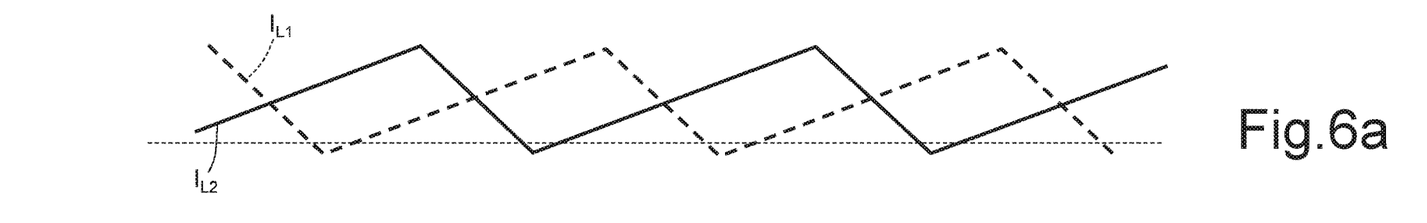
FIGS. 6a-6e show plots of control quantities in the PFC regulator of FIG. 5.
Figure 6B:
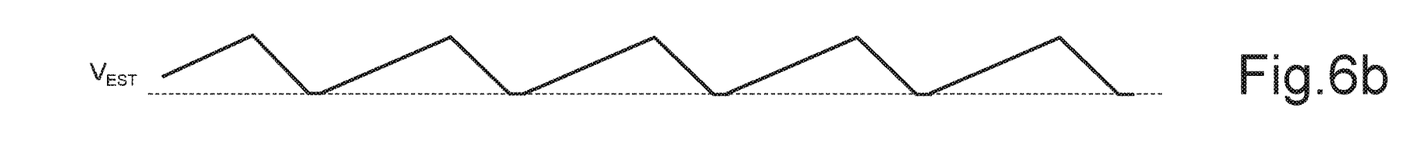
Figure 6C:
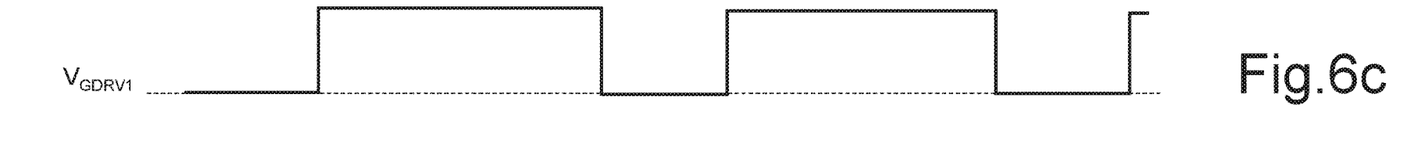
Figure 6D:
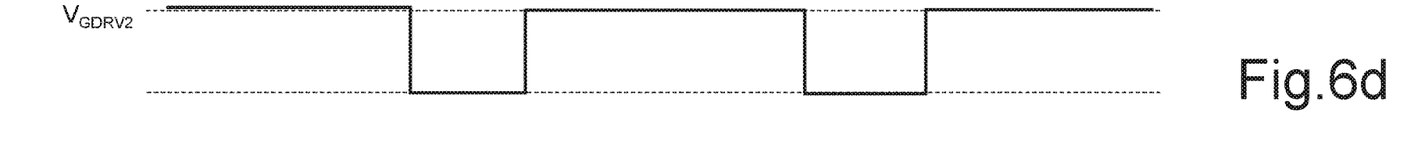
Figure 6E:
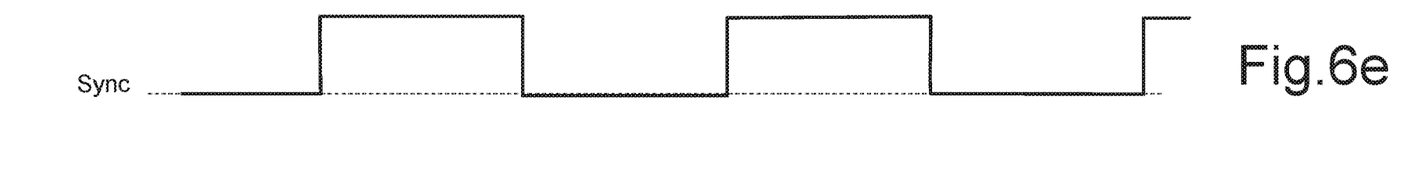

The synchronism stage 32 further comprises: a comparator 56, which compares the voltage on the capacitor element 51, designated by $V_{EST}$, with a reference voltage (in the example, the ground potential) and generates at output a timing signal Temp; and a synchronization stage 57, which receives the timing signal Temp and generates, on the basis of the same timing signal Temp, the synchronism signal Sync for interleaved control of the converter stages 3.

In particular, the output of the comparator 56 switches, in the example from a low value to a high value, at the instant of complete discharge of the capacitor element 51. As highlighted previously, the discharging time of the capacitor element 51 thus represents the estimate of the duration of the desired fraction of the OFF interval $T_{OFF}$ of the duty cycle (in the example, the semi-duration $T_{OFF}/2$), which enables overall estimation of the desired fraction of the switching period $T_{SW}$.

The synchronism signal Sync thus has, in this example, rising and falling edges appropriately phase-offset by 180°, on the basis of which it is possible to synchronize the PWM command voltages $V_{G1}$, $V_{G2}$. In general, the synchronism signal Sync switches at instants spaced apart by the desired fraction of the switching period $T_{SW}$.

The synchronism stage 32 further comprises a timing-management unit 60, configured to generate the enable signal EN as a function of the PWM command signals $V_{G1}$, $V_{G2}$.

In detail, the timing-management unit 60 comprises: a first rising-edge detector 61 and a second rising-edge detector 62, which receive the PWM command signals $V_{G1}$, and $V_{G2}$, respectively, and generate a respective rising-edge detection signal $S_{f1}$, $S_{f2}$; an OR logic gate 64, which receives at input the rising-edge detection signals $S_{f1}$, $S_{f2}$; and an S/R flip-flop 65, which has a reset input connected to the output of the OR logic gate 64, an output $\overline{Q}$, which supplies the enable signal EN, and a set input, which receives the timing signal Temp.

The enable signal EN thus has a high logic value at any of the rising edges of the PWM command signals $V_{G1}$, $V_{G2}$, consequently enabling the determination stage 30. The enable signal EN thus enables the operation of the synchronism stage 32 to be locked to the timing of the converter stages 3.

FIGS. 6a-6e show the plot of some of the signals previously described regarding operation of the control device 2, and in particular: the currents $I_{L1}$, $I_{L2}$ (FIG. 6a) in the inductive elements 10 of the converter stages 3 (which are, in the example, appropriately phase-offset by 180°); the voltage $V_{EST}$ on the capacitor element 51 of the synchronism stage 32 (FIG. 6b); the driving signals $V_{GDRV1}$, $V_{GDRV2}$ (FIGS. 6c and 6d) for the control terminals of the switch elements 12 of the converter stages 3 (which are also appropriately phase-offset by 180°); and the synchronism signal Sync (FIG. 6e), which generates the desired phase offset as a function of its rising and falling edges.

Figure 7A:
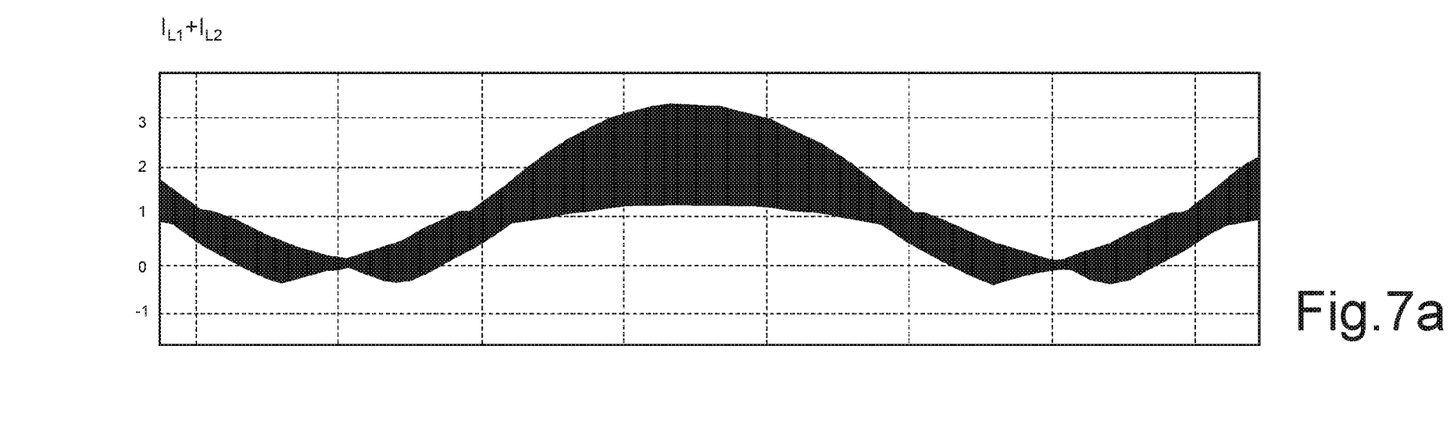
FIGS. 7a and 7b show plots regarding the performance of the control device of the PFC regulator of FIG. 3.
Figure 7B:
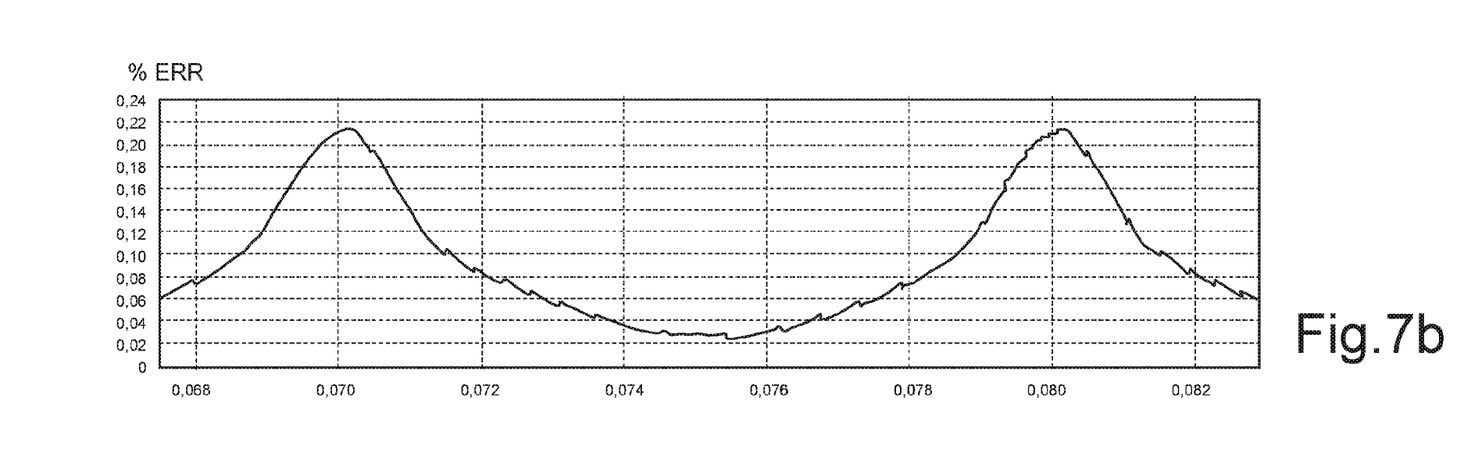

FIGS. 7a and 7b further show, respectively, the sum of the currents $I_{L1}$, $I_{L2}$, and the percentage of interleaving error (% err) throughout a line cycle. In particular, these plots show that the solution described enables a percentage error not higher than approximately 20% throughout the line cycle to be obtained.

An alternative embodiment of the present solution (illustrated in FIG. 8) envisages a digital implementation of the control device 2, which operates in any case according to the modalities described in detail previously.

Figure 8:
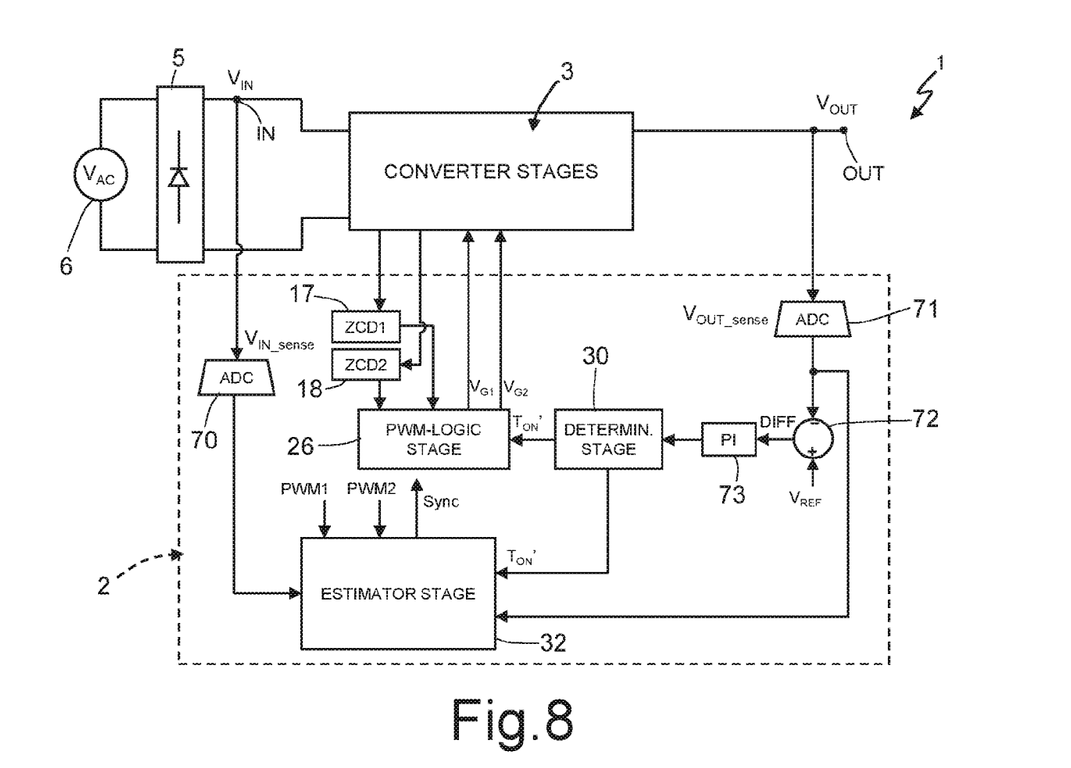
FIG. 8 is a schematic block diagram of a PFC regulator and of a corresponding control device according to a further embodiment of the present disclosure.

In this case, the control device 2 comprises: a first analog-to-digital converter stage 70 and a second analog-to-digital converter stage 71, which are designed to convert into digital form the sensing voltages $V_{IN\_sense}$ and $V_{OUT\_sense}$, respectively; a subtractor block 72, which performs the subtraction between the sensing voltage $V_{OUT\_sense}$ and the reference voltage $V_{ref}$ and generates a difference signal Diff; a proportional-integral (PI) control stage 73, which receives at input the difference signal Diff; the determination stage 30, which is connected to the output of the PI control stage 73 and is designed to determine, on the basis of the proportional-integral control action, the duration of the ON interval ($T_{ON}$) in the switching period $T_{SW}$; the PWM-logic stage 26, which receives at input signal $T_{ON}'$ indicative of the duration of the ON interval $T_{ON}$, control signals $ZCD_1$, $ZCD_2$, indicating the condition of demagnetization of the inductive elements 12 of the corresponding converter stages 3, and a synchronism signal Sync, for generating the PWM command signals, once again designated by $V_{G1}$, $V_{G2}$, for the switch elements 12 of the converter stages 3; and the synchronism stage 32, which receives the digital sensing voltages $V_{IN\_sense}$ and $V_{OUT\_sense}$, the signal $T_{ON}'$ indicative of the duration of the interval $T_{ON}$, and the command signals $V_{G1}$, $V_{G2}$, and generates the synchronism signal Sync for the PWM-logic stage 26, in particular using the following expression for estimating the switching period $T_{SW}$ (which represents the expression of energy balance):

$$T_{SW}/2 = T_{ON}/2 \cdot \left(\frac{V_{out}}{V_{out} - V_{in}}\right)$$

Figure 9:
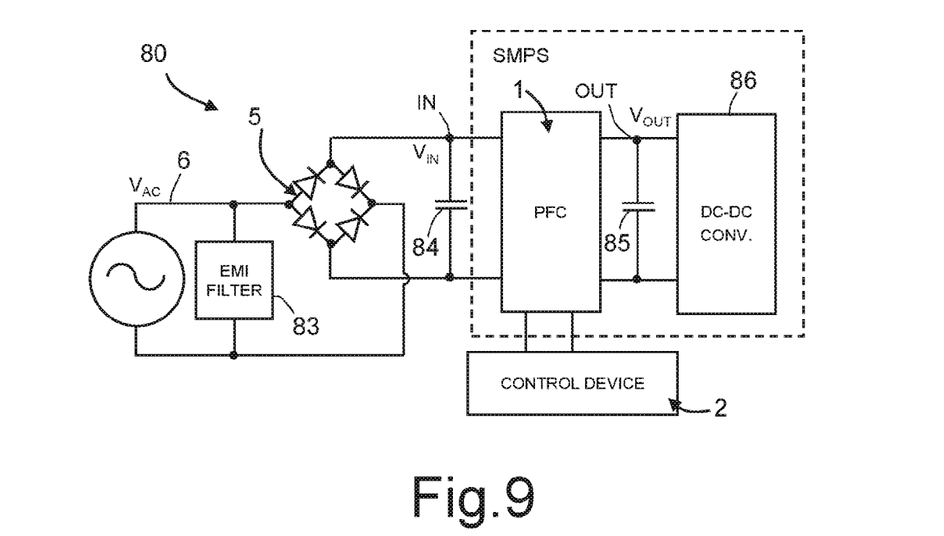
FIG. 9 shows a schematic block diagram of a power supply including the PFC regulator of FIG. 3 according to a further aspect of the present solution.

As mentioned previously, the PFC regulator 1 and the corresponding control device 2 may be advantageously used in a switching power supply 80, as illustrated schematically in FIG. 9.

In particular, the switching power supply 80 comprises the rectifier stage 5 (for example, of the diode-bridge type), connected to the electrical mains supply 16, in the example through an EMI filter 83, and an input capacitor element 84, connected to the output of the rectifier stage 5, present on which is the input voltage $V_{IN}$.

The switching power supply 80 further comprises the PFC regulator 1, having its input terminal IN connected to the input capacitor element 84 and its output terminal OUT connected to an output capacitor element 85 (coinciding with the charge-storage element 7, defined previously).

The control device 2 controls operation of the PFC regulator 1 for ensuring a desired power factor in the absorption from the electrical grid 16.

The switching power supply 80 further comprises an output power converter 86, in the example of a DC/DC type, which has its input connected to the output capacitor element 85 and is designed to supply to a load (not illustrated) a desired value of output voltage, for example with a value appropriately lower than the value of the output voltage $V_{OUT}$.

The advantages of the solution proposed emerge clearly from the foregoing description.

In particular, the above solution enables operation in interleaved transition mode of two or more power converter stages, maintaining a desired synchronism, or phase ratio, between the PWM command signals supplied to the various converter stages, also during possible start-up and shut-down operating transients.

In other words, the solution proposed is able to guarantee operation in transition mode (TM) of the interleaved phases. The interleaving error is extremely low in stationary conditions, and phase locking is also maintained in the transient condition. The present Applicant has found out a very low level of interleaving errors also in the case of high mismatch, for example in the region of +/−10%, in the values of inductance of the inductive elements of the various converter stages.

The solution discussed consequently enables full exploitation of the advantages afforded by interleaving of the converter stages, amongst which, for example, the high power that may be obtained, or the low output ripple.

The solution is further altogether integrated, without the need to resort to external circuits or dedicated pins.

Finally, it is clear that modifications and variations may be made to what has been described and illustrated herein, without thereby departing from the scope of the present disclosure.

By way of example, the information regarding the input and output voltages required for the estimator stage 32 could be obtained with other methodologies. It is possible to obtain the currents for charging and discharging the capacitor element 51 of the estimator stage 32 directly via pins ZCD1 and ZCD2, by appropriately sampling the current generated by the respective auxiliary windings 15.

The methodology proposed may further be extended, in the case where it is deemed appropriate, also to discontinuous operation, by timing the signals $V_{ZCD1}$, $V_{ZCD2}$ according to the well-known valley-skipping technique. At low levels of load, the interleaved stages could in this way operate discontinuously at the same time ensuring interleaving.

The control device and method described may in general be used for controlling any interleaved switching regulator, not only for applications of power-factor control, to which explicit reference has been made in the foregoing description.

Furthermore, even though the foregoing description has made explicit reference to a type of boost converter, the present solution may be applied also to other types of converters, for example flyback converters, buck-boost converters, and variants thereof.

It is also evident that the converter could be supplied also by a supply source different from the electrical mains supply.

Finally, it is emphasized that the converter according to the present solution may advantageously provide a voltage regulator or converter, to which the foregoing treatment has made explicit reference by way of non-limiting example, or a current regulator or converter (for example, in LED drivers or battery chargers).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to [insert list], are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device, comprising:
control circuitry configured to control a switching regulator including two or more converter stages operating with interleaved operation, each converter stage including an inductive element and a switch element, the control circuitry configured to generate command signals having a switching period to control the switching of the switch element of each converter stage and configured to determine alternation of a storage phase to store energy from an input quantity in a corresponding inductive element and a transfer phase to transfer the stored energy in the corresponding inductive element onto an output element on which an output quantity is present, the control circuitry configured to generate the command signals phase-offset by a fraction of said switching period to obtain said interleaved operation, and the control circuitry including:
a determination stage configured to generate, based upon a value of the output quantity, an interleaving determination signal indicative of an ON interval duration of said switching period;
an estimator stage configured to generate a single synchronism signal and being configured to receive said interleaving determination signal and the command signals and to estimate a desired fraction of the switching period based on the ON interval, the command signals, the input quantity, and the output quantity; and
a control stage configured to receive said single synchronism signal and to receive from each of the two or more converter stages a control voltage indicating a zero-cross current in the inductive element of a corresponding converter stage, the control stage further configured, in response to the single synchronism signal and the control voltages from the two or more converter stages, to generate the command signals to implement a transition-mode control for each of the two or more converter stages.

2. The control device according to claim 1, wherein said single synchronism signal has switching edges spaced apart by the desired fraction of the switching period.

3. The control device according to claim 2 wherein each of said two or more converter stages comprises an auxiliary winding magnetically coupled to said inductive element of the corresponding converter stage, each auxiliary winding configured to generate the control voltage indicating the zero-cross current in the inductive element of the corresponding converter stage.

4. The control device according to claim 3, wherein said estimator stage is configured to estimate said desired fraction of the switching period based on a relation of energy balance in the inductive element of the corresponding converter stage during the switching period which links the stored energy in the inductive element of the corresponding converter stage during a corresponding fraction of the ON interval of said duration of said switching period and the energy transferred to the output element during a corresponding fraction of an OFF interval of said duration of said switching period, and to generate the single synchronism signal based on the estimate of the desired fraction of the switching period.

5. The control device according to claim 4, wherein said energy-balance relation is $$\int_0^{T_{ON}} V_{IN}(t) \cdot dt = \int_{T_{ON}}^{T_{sw}} (V_{OUT}(t) - V_{IN}(t)) \cdot dt$$

wherein $V_{IN}$ is an input voltage corresponding to the input quantity, $V_{OUT}$ is an output voltage corresponding to the output quantity, t represents time, $T_{ON}$ is the ON interval duration of said switching period generated by the determination stage, and $T_{SW}$ is the estimated desired fraction of the switching period generated by the estimator stage.

6. The control device according to claim 1, wherein said estimator stage is configured to receive said command signals and to determine an end of an OFF interval duration of the switching period of said command signals as a function of said control voltage indicating the zero-cross current in the inductive element of the corresponding converter stage and further as a function of said single synchronism signal.

7. The control device according to claim 6, wherein said estimator stage is further configured to generate an enable signal as a function of said command signals and said estimated desired fraction of the switching period, the enable signal being provided to the determination stage and the determination stage configured to generate the single synchronism signal based on the enable signal.

8. The device according to claim 1, wherein said control stage is further configured to receive the single synchronism signal from the estimator stage and time signals from the converter stages, each time signal indicating the duration of the ON interval of the corresponding converter stage, and the control stage further configured to generate said command signals to cause each converter to have substantially a same ON interval of the duration of the switching period during each line cycle associated with the input quantity.

9. The control device according to claim 1, wherein said switching regulator comprises two converter stages, and wherein the fraction of said switching period corresponds to one half of said switching period.

10. An electrical apparatus, comprising:
a PFC regulator including a switching regulator comprising two or more converter stage circuits operating with interleaved operation, each converter stage circuit including an inductive element and a switch element; and
a control device configured to generate command signals having a switching period for controlling switching of the switch element of each converter stage circuit and determining alternation of a storage phase to store energy from an input quantity in a corresponding inductive element and of a transfer phase of the stored energy in the corresponding inductive element onto an output element on which an output quantity is generated, the control device configured to generate the command signals phase-offset by an appropriate fraction of said switching period to obtain said interleaved operation, and the control device including:
a determination stage configured to generate, based upon a value of the output quantity, an interleaving signal indicative of an ON interval of a duty cycle of said switching period;
an estimator stage configured to receive said interleaving signal and the command signals, and configured to estimate a desired fraction of the switching period based on the ON interval, the command signals, the input quantity, and the output quantity, and to generate a single synchronism signal indicating the desired fraction of the switching period; and
a control stage configured to receive said single synchronism signal and to receive from each of the two or more converter stage circuits a control voltage indicating a zero-cross current in the inductive element of a corresponding one of the two or more converter stage circuits, the control stage circuit further configured to generate the command signals for each of the converter stage circuits in response to the single synchronism signal and the control voltages from the two or more converter stage circuits, the command signals having timing determined by said single synchronism signal to control each of the two more converter stage circuits in transition-mode operation.

11. The electrical apparatus according to claim 10 further comprising:
an input stage coupled to a supply source for supplying said input quantity;
an output stage designed to supply a regulated quantity to a load as a function of said output quantity; and
wherein said control device is configured to control a power-factor correction in a power absorption from said supply source by said PFC regulator.

12. The electrical apparatus of claim 11, wherein the output stage comprises a dc-dc converter.

13. The electrical apparatus of claim 11, wherein the input stage comprises a rectifier circuit configured to receive an alternating input voltage and to rectify this alternating input voltage to generate the input quantity.

14. The electrical apparatus of claim 11, wherein the control device includes analog-to-digital converter circuitry for generating digital values of the input quantity and the output quantity.

15. The electrical apparatus of claim 11, wherein the PFC regulator has one of a boost converter, a flyback converter, and a buck-boost converter topology.

16. A control method, comprising:
generating command signals to control operation of a switching regulator including two or more converter stages operating with interleaved operation, each converter stage including an inductive element and a switch element, the command signals having a switching period for controlling switching of the switch element of each converter stage and determining alternation of a storage phase of energy from an input quantity in a corresponding inductive element and a transfer phase of the stored energy onto an output element on which an output quantity is present;
generating the command signals for the converter stages phase-offset by an appropriate fraction of said switching period to obtain said interleaved operation of the converter stages; and
generating, based upon a value of the output quantity, an interleaving signal indicative of an ON interval of a duty cycle of said switching period;
estimating a desired fraction of the switching period based on the ON interval, the command signals, the input quantity, and the output quantity;
generating a synchronism signal based on the interleaving signal and the estimated desired fraction of the switching period;
detecting in each of the two or more converter stages a zero-crossing current in the corresponding inductive element of the converter stage; and
generating the command signals for the two more converter stages based on said synchronism signal and the detected zero-crossing currents in the two more converter stages to control each of the two or more converter stages in a transition mode of operation.

17. The control method according to claim 16, wherein said synchronism signal has switching edges spaced apart by the desired fraction of the switching period, and said generating command signals comprises generating the command signals so that said command signals switch at the switching edges of said synchronism signal.

18. The method according to claim 16, wherein each converter stage comprises an auxiliary winding magnetically coupled to said inductive element of a corresponding converter stage and wherein detecting in each of the two or more converter stages the zero-crossing current in the corresponding inductive element of the converter stage comprises detecting a corresponding control voltage across a corresponding auxiliary winding.

19. The method according to claim 18, comprising determining an end of said OFF interval at a switching edge of said synchronism signal, which follows switching of said control voltage.

\* \* \* \* \*